UNITED STATES PATENT OFFICE.

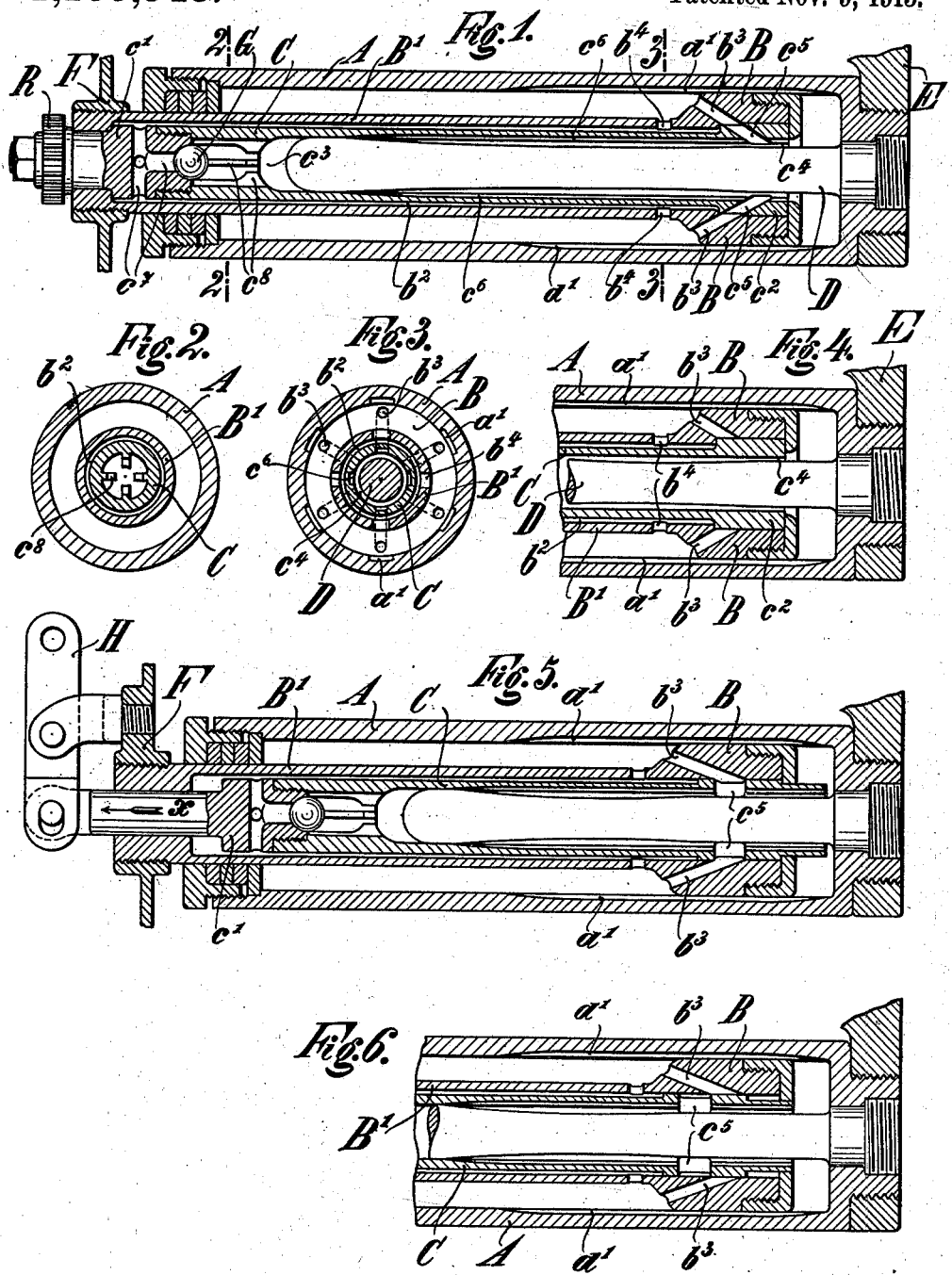

FRIEDRICH STOCK, OF ESSEN-ON-THE-RUHR, GERMANY, ASSIGNOR TO FRIED. KRUPP AKTIENGESELLSCHAFT, OF ESSEN-ON-THE-RUHR, GERMANY.

FLUID-BRAKE FOR BARREL-RECOIL GUNS.

1,159,543.   Specification of Letters Patent.   Patented Nov. 9, 1915.

Application filed May 19, 1910. Serial No. 562,263.

*To all whom it may concern:*

Be it known that I, FRIEDRICH STOCK, a subject of the Emperor of Germany, and a resident of Essen-on-the-Ruhr, Germany, have invented certain new and useful Improvements in Fluid-Brakes for Barrel-Recoil Guns, of which the following is a specification.

The subject of the present invention is a fluid brake for barrel recoil guns which is provided with an arrangement for regulating the length of recoil.

In the drawings: Figure 1 shows a constructional form of the subject matter of the invention in longitudinal section; the parts are represented in the position which they assume with the gun barrel in firing position and the adjustment for the longest recoil; Fig. 2 is a section on the line 2—2 of Fig. 1, seen from the left; Fig. 3 is a section on the line 3—3 of Fig. 1, likewise seen from the left; Fig. 4 shows a portion of Fig. 1 with the parts in those positions which they assume with adjustment to the shortest recoil; Fig. 5 is a view corresponding to Fig. 1, showing a second constructional form of the invention; and Fig. 6 shows a portion of Fig. 5 with the parts in those positions which they assume with adjustment to the shortest recoil.

The constructional form illustrated in Figs. 1 to 4 will be described first.

The fluid brake consists essentially of the brake cylinder A, the brake piston B with its hollow piston rod $B^1$, a hollow cylinder C arranged in the piston rod and in the piston, and a running-out or throttling rod D projecting into the cylinder C.

The brake cylinder A is rigidly connected to the spur E of the gun barrel and the piston rod $B^1$ to the end F of the upper carriage (not shown). Through the medium of a socket $c^1$ screwed into the cylinder C, (Fig. 1) the latter is mounted in that end of the piston rod $B^1$ which is connected with the end F of the upper carriage, and through the medium of the enlarged head $c^2$, is mounted rotatably but non-slidably in the piston B. The throttling rod D is screwed into the head of the brake cylinder A, which is connected with the spur E of the gun barrel and penetrates into the cylinder C for such a distance that it does not quit it during the longest recoil to which the brake may be adjusted. The free end of the throttling rod D has the same diameter as the bore $c^3$ of the cylinder C. Otherwise, in so far as it penetrates into the hollow of the brake, the rod D has a diameter which is smaller than that of the bore $c^3$ so that between the rod D and the inner wall of the cylinder C, an annular space $c^4$ is provided.

For the flow of the brake fluid from one to the other side of the brake piston B, short passages $a'$ are provided in the wall of the brake cylinder A. Furthermore, the piston B is provided with apertures $b^3$, which lead from the piston rod side of the brake cylinder into the bore of the piston B designed for the reception of the cylinder head $c^2$ and open, when the parts are in the position shown in Fig. 1, into the apertures $c^5$, which are provided in the head $c^2$ of the cylinder C and lead into the annular space $c^4$. On its end which projects from the piston rod $B^1$, the socket $c^1$ carries a toothed wheel R through the assistance of which the cylinder C can be rotated relatively to the piston B and the piston rod $B^1$.

The arrangement thus far described serves for regulating the length of recoil. The effect of this arrangement will next be described. When the gun barrel is in the firing position and the brake is adjusted to the longest recoil, the parts assume the positions shown in Fig. 1. At this time, the apertures $b^3$ stand immediately over the apertures $c^5$. When the barrel of the gun recoils, the brake cylinder A and the throttling rod D will force the brake fluid from the piston rod side of the brake cylinder, on the one hand through the passages $a^1$ and on the other hand through the apertures $b^3$ and $c^5$ as well as the annular space $c^4$, to the other side of the brake cylinder (the piston side). When, during recoil, the ends of the passages $a^1$ which at the beginning of recoil lie on the piston rod side of the brake cylinder, have reached the piston B, the brake fluid can only pass through the apertures $b^3$ and $c^5$ and the annular space $c^4$. This annular space will be gradually reduced in size during the further recoil, in consequence of the form of the throttling rod D to be seen in the drawing, and finally will be completely closed by the free cylindrical end of the rod D. Since now the flow of brake fluid is no longer possible, the recoiling parts will come to a standstill. This, however, owing to the dimensions of the rod D does not take place until after the piston B has executed its full stroke. Should the recoil happen to be very short, the cylinder C will be rotated through the assistance of the toothed wheel R, relatively to the piston B, to such an extent that the full portion of the head $c^2$ of the cylinder C enters in front of the inner ends of the apertures $b^3$. The apertures $c^5$ are then closed toward the piston rod side of the brake cylinder and there remain for effecting the escape of the fluid from one side of the piston to the other, only the short passages $a^1$ (see especially Fig. 4). When their ends, which lie on the piston rod side of the brake cylinder at the beginning of the recoil movement, have reached the piston during the recoil, an escape of fluid is no longer possible and the moving parts come to a standstill. Between the two limiting points of the cylinder C relatively to the piston B, thus established, other positions lie which give lengths of recoil included between the shortest and the longest. At these positions of the cylinder C, the fluid flowing through the apertures $b^3$ and $c^5$, is very powerfully throttled for the most part at the points at which the aforesaid apertures open into each other.

In order to attain a soft running-out movement with each length of recoil, the following arrangement is provided: Between the inner wall of the piston rod $B^1$ and the cylinder C, as well as the socket $c^1$, an annular hollow space $b^2$ is provided, which extends to the head $c^2$ of the cylinder C. The hollow space communicates with the piston rod side of the brake cylinder through apertures $b^4$, which are provided in the piston rod $B^1$. Furthermore, the socket $c^1$ is provided with passages $c^7$, which establish communication between the space $b^2$ and the hollow chamber $c^3$ of the cylinder C. For cutting off the passages $c^7$, a return valve G (Fig. 1) is provided, for which the socket $c^1$ serves as a valve seat, and which is guided by ribs $c^8$ of the cylinder C. Grooves $c^6$ (Figs. 1 and 3) are cut into the inner wall of the cylinder C, which enable the brake fluid to pass from the hollow chamber $c^3$ of the cylinder C, during the running-out of the gun-barrel. The passages $a^1$ are of small cross sectional area in proportion to the apertures $b^3$, $c^5$ and the annular chamber $c^4$. In consequence of the arrangement thus described, when recoil takes place, the braking fluid, can by raising the valve G from its seat, flow from the fluid chamber, located on the piston rod side of the brake cylinder A, through the apertures $b^4$, the annular hollow space $b^2$ and the passages $c^7$, to the hollow chamber $c^3$ of the cylinder C. During the running-out movement of the gun barrel, the valve G is closed by the excess of pressure in the chamber $c^3$ of the cylinder C and the fluid will be forced by the throttling rod D, out of the chamber $c^3$, through the grooves $c^6$ into the fluid chamber of the brake cylinder. When the arrangement thus described for braking the running-out movement, is to be combined with the arrangement for regulating the length of recoil first described herein, and as shown in the drawing, the effect of the arrangement for regulating the length of recoil will be somewhat influenced thereby. No essential modification of the effect, however, will be caused.

The constructional form of the subject matter of the invention shown in Figs. 5 and 6 differs from that already described only in that the cylinder C is connected with the piston B and the piston rod $B^1$, not rotatably but with longitudinal movement. In order to accomplish the longitudinal displacement of the cylinder C from the outside, the end of the socket $c^1$, which projects out of the piston rod $B^1$, is connected with a two-armed lever H, which is fulcrumed on the end F of the upper carriage. When the cylinder C of this brake assumes the position to the piston B, which is shown in Fig. 5, that is to say when the apertures $c^5$ of the cylinder C stand directly over the apertures $b^3$ of the piston, the brake is adjusted for the longest recoil. The shortest recoil is attained when the cylinder C is displaced in the direction of the arrow $x$ (Fig. 5) such a distance that the apertures $c^5$ of the piston B are fully covered (Fig. 6) since at this time the fluid can flow through the passages $a^1$ of the brake cylinder A, alone, during recoil.

I claim:—

1. In a fluid brake for recoil guns adjustable to regulate the length of recoil; and comprising a brake cylinder, and a braking piston working therein, a primary by-pass leading from the pressure side of the braking piston to the free space beyond said piston and having a length corresponding to the shortest recoil; a secondary by-pass independent of the primary by-pass, also leading from the pressure side of the braking piston to the free space beyond said piston; and a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil.

2. A fluid brake for regulating the length of recoil in barrel recoil guns, comprising a brake cylinder constructed with a wall-groove providing a fluid by-pass; a piston having a single cut-off edge adapted to coöperate with said wall-groove by-pass; said brake being also constructed with an additional by-pass independent of the wall-groove by-pass and adapted to permit continued escape of the fluid beyond the shortest recoil; said additional by-pass having regulating means for wholly closing it when the wall-groove by-pass alone is to determine the length of recoil and adjustable to vary the capacity of said additional by-pass, and thereby permit varying lengths of recoil beyond said shortest recoil.

3. In a fluid brake for recoil guns adjustable to regulate the length of recoil; and comprising a brake cylinder, and a braking piston working therein, a primary by-pass leading from the pressure side of the braking piston to the free space beyond said piston, and having a length corresponding to the shortest recoil; and a secondary by-pass independent of the primary by-pass, also leading from the pressure side of the braking piston to the free space beyond said piston, and a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil; said regulating means being further adjustable to vary the capacity of said secondary by-pass, and thereby permit varying lengths of recoil beyond said shortest recoil.

4. In a fluid brake for recoil guns adjustable to regulate the length of recoil, and comprising a brake cylinder, and a braking piston working therein; a primary by-pass leading from the pressure side of the braking piston to the free space beyond said piston, and corresponding in length to the shortest recoil; a secondary by-pass independent of the primary by-pass, also leading from the pressure side of the braking piston to the free space beyond said piston; and a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil; said regulating means being further adjustable to vary the capacity of said secondary by-pass, and thereby permit varying lengths of recoil beyond said shortest recoil; said secondary by-pass comprising an aperture leading from one side of the brake piston toward the axis thereof; said regulating means having an aperture coacting with the piston aperture and communicating with the other side of said piston, independently of the wall-groove by-pass.

5. In a fluid brake for recoil guns adjustable to regulate the length of recoil, and comprising a brake cylinder, and a braking piston working therein; a primary by-pass leading from the pressure side of the braking piston to the free space beyond said piston and corresponding in length to the shortest recoil; a secondary by-pass independent of the primary by-pass, also leading from the pressure side of the braking piston to the free space beyond said piston; a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil, and means for automatically closing said secondary by-pass at the end of a long recoil.

6. In a fluid brake for recoil guns adjustable to regulate the length of recoil, and comprising a brake cylinder, and a braking piston working therein; a primary by-pass leading from the pressure side of the braking piston to the free space beyond said piston, and corresponding in length to the shortest recoil; a secondary by-pass independent of the primary by-pass, also leading from the pressure side of the braking piston to the free space beyond said piston and a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil, and means for automatically closing said secondary by-pass at the end of a long recoil, comprising a throttling rod fitting against said additional by-pass at the end of said long recoil.

7. In a fluid brake for recoil guns adjustable to regulate the length of recoil, and comprising a brake cylinder, and a braking piston working therein; a primary by-pass leading from the pressure side of the braking piston to the free space beyond said piston and corresponding in length to the shortest recoil; a secondary by-pass independent of the primary by-pass, also leading from the pressure side of the braking piston to the free space beyond said piston; a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil; said secondary by-pass comprising an aperture in and leading from one side of the brake piston toward the axis of said brake piston; said regulating means comprising a cylinder arranged coaxially within the brake piston and having an aperture coacting with the piston aperture and communicating with the opposite side of the brake piston; and means for automatically closing the secondary by-pass at the end of the longest recoil, comprising a throttling rod arranged coaxially with the regulating cylinder to move relatively thereto during the recoil and having a portion of its length reduced to leave a fluid passage within said regulating cylinder but enlarged beyond said reduced portion and fitting over and closing said regulating cylinder aperture at the end of the longest recoil.

8. A fluid brake for regulating the length of recoil in barrel recoil guns, comprising a brake cylinder constructed with a wall-groove providing a fluid by-pass; a piston having a single cut-off edge adapted to co-operate with said wall-groove by-pass; said brake being also constructed with an additional by-pass independent of the wall-groove by-pass and adapted to permit continued escape of the fluid after said wall-groove by-pass is closed; said additional by-pass having regulating means for wholly closing it when the wall-groove by-pass alone is to determine the length of recoil and adjustable to vary the capacity of said additional by-pass, and thereby permit varying lengths of recoil beyond the shortest recoil; and means for automatically closing said additional by-pass at the end of a long recoil, comprising a throttling rod fitting against said additional by-pass at the end of said long recoil.

9. A fluid brake for regulating the length of recoil in barrel recoil guns, comprising a brake cylinder constructed with a wall-groove providing a fluid by-pass; a piston having a single cut-off edge adapted to co-operate with said wall groove by-pass; said brake being also constructed with an additional by-pass independent of the wall-groove by-pass and adapted to permit continued escape of the fluid after said wall groove by-pass is closed; said additional by-pass having regulating means for wholly closing it when the wall-groove by-pass alone is to determine the length of recoil and adjustable to vary the capacity of said additional by-pass, and thereby permit varying lengths of recoil beyond the shortest recoil; and means for automatically closing said additional by-pass at the end of a long recoil, comprising a throttling rod fitting against said additional by-pass at the end of said long recoil; said throttling rod acting as a piston on the return movement and thereby braking the running-out movement of the gun barrel.

10. In a fluid brake for recoil guns adjustable to regulate the length of recoil, and comprising a brake cylinder, and a braking piston working therein; a primary by-pass leading from the pressure side of the braking piston to the free space beyond said piston, and having a length corresponding to the shortest recoil; a secondary by-pass independent of the primary by-pass, also leading from the pressure side of the braking piston to the free space beyond said piston; a regulating means adjustable at will, said secondary by-pass comprising an aperture in and leading from one side of the braking piston toward the axis of said brake piston; said regulating means adjustable to wholly close said secondary by-pass or to vary the capacity thereof and thereby permit varying lengths of recoil beyond said shortest recoil, said regulating means comprising a cylinder arranged coaxially within the braking piston and having an aperture coacting with the piston aperture and communicating with the opposite side of the braking piston, and means for automatically closing the secondary by-pass at the end of the longest recoil, comprising a throttling rod arranged coaxially with the regulating cylinder to move relatively thereto during the recoil and having a portion of its length reduced to leave a fluid passage within said regulating cylinder but enlarged beyond said reduced portion and fitting over and closing said regulating cylinder aperture at the end of the longest recoil; said regulating cylinder having means to admit fluid beyond the enlargement of the throttling rod, during the recoil movement, and said throttling rod being thereby adapted to serve as a brake piston in the running-out movement of the gun barrel.

11. In a fluid brake for recoil guns adjustable to regulate the length of recoil, and comprising a brake cylinder, and a braking piston working therein; a primary by-pass leading from the pressure side of the braking piston to the free space beyond said piston, and corresponding in length to the shortest recoil; a secondary by-pass independent of the primary by-pass, also leading from the pressure side of the braking piston to the free space beyond said piston; a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil; said braking piston having a hollow piston rod, a cylinder mounted in said hollow piston rod and adapted to regulate the cross sectional area of the secondary by-pass, said cylinder having a hollow space and a passageway communicating with the piston rod side of the brake cylinder; a valve adapted to close said passage way on the counter recoiling movement of the gun barrel; and means for regulating said counter-recoiling movement.

12. In a fluid brake for recoil guns adjustable to regulate the length of recoil, and comprising a brake cylinder, and a braking piston working therein; a primary by-pass leading from the pressure side of the braking piston to the free space beyond said piston, and corresponding in length to the shortest recoil; and a secondary by-pass independent of the primary by-pass, also leading from the pressure side of the braking piston to the free space beyond said piston; said braking piston having a hollow piston rod; a cylinder mounted in said hollow piston rod and adapted to regulate the cross sectional area of the secondary by-pass; said cylinder having a hollow space and a passageway communicating with the piston rod side of the brake cylinder; a valve adapted to close said passageway on the counter recoiling movement of the gun barrel; and means for regulating said counter-recoiling movement, comprising a rod acting as a piston in the piston rod cylinder.

13. In a fluid brake for recoil guns adjustable to regulate the length of recoil, and comprising a brake cylinder, and a braking piston working therein; a primary by-pass leading from the pressure side of the braking piston to the free space beyond said piston, and corresponding in length to the shortest recoil; a secondary by-pass independent of the primary by-pass, also leading from the pressure side of the braking piston to the free space beyond said piston; a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil; said braking piston having a hollow piston rod; the secondary by-pass regulating means comprising a cylinder mounted in said hollow piston rod and adapted to regulate the cross sectional area of the secondary by-pass; said cylinder having a hollow space and a passageway communicating with the piston rod side of the brake cylinder; a valve adapted to close said passageway on the counter recoiling movement of the gun barrel; a socket member through which the piston rod cylinder is connected with the piston rod beyond said hollow space; and a seat for said valve being formed in said socket member.

14. In a fluid brake for recoil guns adjustable to regulate the length of recoil, and comprising a brake cylinder, and a braking piston working therein; a primary by-pass leading from the pressure side of the braking piston to the free space beyond said piston, and corresponding in length to the shortest recoil; a secondary by-pass independent of the primary by-pass, also leading from the pressure side of the braking piston to the free space beyond said piston; a regulating means adjustable at will adapted to close said secondary by-pass to permit the primary by-pass to serve alone in limiting recoil, and also adapted to open said secondary by-pass to add its capacity to that of the primary by-pass during said shortest recoil piston travel, and permit of additional recoil travel beyond said shortest recoil; said braking piston having a hollow piston rod; the regulating means for the secondary by-pass comprising a cylinder mounted in said hollow piston rod and adapted to regulate the cross sectional area of the secondary by-pass; said cylinder having a hollow space and a passageway communicating with the piston rod side of the brake cylinder; a valve adapted to close said passageway on the counter recoiling movement of the gun barrel; means for regulating the counter-recoiling movement comprising a rod acting as a piston in the piston rod cylinder, and by-pass grooves in the wall of said piston rod cylinder, adapted to be closed by said rod at the end of the running-out movement.

15. A fluid brake for barrel recoil guns provided with means for regulating the length of recoil comprising a brake cylinder, a piston operable therein and having a hollow piston rod, said cylinder and piston provided with throttling passageways for the passage of the brake fluid from one side of the piston to the other, the brake cylinder passageways being of the length which corresponds to the shortest recoil, a cylinder mounted in said hollow piston rod and adapted to regulate the cross sections of the piston passageways, said cylinder having a hollow space communicating by passageways with the piston rod side of the brake cylinder, a valve operable to close said last named passageways on the counter-recoiling movement of the gun barrel, and a throttling bar secured to the brake cylinder and adapted to regulate the counter-recoiling movement of the gun barrel.

16. A fluid brake for barrel recoil guns comprising a cylinder having relatively short fluid throttling passageways and a throttling bar, a piston operable within the cylinder, and having a hollow piston rod with throttling passageways and cooperating with the throttling bar, said piston having throttling passageways and means for restricting the same whereby to regulate the braking action of the gun-barrel for different lengths of recoil, and said cylinder throttling passageways effecting to brake a portion of the counter-recoiling movement of the gun barrel and said throttling bar and piston rod passageways effecting to brake the complete counter-recoiling movement thereof.

17. A fluid brake for barrel recoil guns comprising a cylinder having throttling passageways, a throttling bar secured to the cylinder, a piston operable within the cylinder, a hollow piston rod supporting the piston and coöperating with said throttling bar, said piston and hollow piston rod having throttling passageways and the chambers of the cylinder and the hollow piston rod communicating, a valve controlling said communication, and means exteriorly of the cylinder for restricting the throttling passageways of the piston, whereby to regulate the braking action of the gun barrel for different lengths of recoil, and said throttling bar and the hollow piston rod adapted to come into action and brake the counter-recoiling movement of the gun barrel.

18. A fluid brake for barrel recoil guns comprising a cylinder having throttling passageways, a throttling bar secured to said cylinder, a piston operable within the cylinder, and having throttling passageways, a hollow piston rod supporting said piston and receiving the throttling bar, said piston and piston rod comprising a two part piston head and piston rod, means exteriorly of the cylinder for adjusting one of the piston head parts relatively to the other whereby to restrict the throttling passageways therein and regulate the braking action of the gun barrel for different lengths of recoil, said piston rod parts providing a fluid space between them, and said space being in communication with the cylinder chamber and the space within the hollow piston rod, and a valve controlling the communication between said piston rod parts and operable to close said communication on the counter-recoiling movement of the gun barrel.

The foregoing specification signed at Barmen, Germany, this 3rd day of May, 1910.

FRIEDRICH STOCK. [L. S.]

In presence of—
OTTO KÖNIG,
CHAS. J. WRIGHT.